United States Patent

[11] 3,610,721

[72] Inventors Edward Abramson
Wilmington, Del.;
John C. Caris, Dallas, Tex.; Philip A. Flournoy, Wilmington, Del.; Monroe S. Sadler, Kennett Square, Pa.
[21] Appl. No. 872,341
[22] Filed Oct. 29, 1969
[45] Patented Oct. 5, 1971
[73] Assignee E. I. du Pont de Nemours and Company
Wilmington, Del.
Continuation-in-part of application Ser. No. 561,811, June 30, 1966, now abandoned.

[54] MAGNETIC HOLOGRAMS
7 Claims, 5 Drawing Figs.

[52] U.S. Cl. .......... 350/3.5, 340/174.1 M, 346/74 MT, 350/150, 350/151
[51] Int. Cl. .......... G02b27/00, G11 5/00
[50] Field of Search .......... 350/3.5, 151; 346/74 M, 74 MT, 74 MP; 340/174.1 MO

[56] References Cited
UNITED STATES PATENTS

| | | | |
|---|---|---|---|
| 3,364,496 | 1/1968 | Greiner et al. | 340/174.1 |
| 3,347,614 | 10/1967 | Fuller et al. | 350/151 |
| 3,368,209 | 2/1968 | McGlauchlin et al. | 350/151 |
| 3,444,530 | 5/1969 | Majima | 340/174.1 |
| 3,465,311 | 9/1969 | Bertelsen et al. | 340/174.1 |
| 3,506,327 | 4/1970 | Leith et al. | 350/3.5 |
| 3,513,457 | 5/1970 | Nelson | 350/151 |

*Primary Examiner*—David Schonberg
*Assistant Examiner*—Ronald J. Stern
*Attorney*—D. R. J. Boyd

ABSTRACT: An off-axis magnetic holographic record and its preparation are described. The record may be prepared, for example, by splitting the coherent beam of radiation, e.g., a pulsed laser beam, into two parts, one part impinging directly onto a magnetic recording member containing a magnetic material of low Curie point, e.g., ferromagnetic chromium oxide, the other part striking first a three-dimensional scene to be reproduced and being reflected therefrom onto the same magnetic recording member, the phase of the two parts of the laser beam being altered by the different treatments they have undergone and producing essentially an interference pattern of heat in the magnetic recording member under magnetic conditions which change the heat pattern to a pattern of magnetization. The pattern can be read out and reassembled into a three-dimensional photograph, for example, by means of a polarized light.

MAGNETIC HOLOGRAMS

RELATED APPLICATIONS

This application is a continuation-in-part of application, Ser. No. 561,811 filed June 30, 1966 now abandoned.

BACKGROUND OF THE INVENTION

This invention relates to magnetic holographic storage media for recording information, and more especially to a process for recording information as magnetic holograms and reconstructing the information therefrom using magnetic/optical means.

Broadly, the present invention contemplates an information storage and retrieval system which reduces or eliminates the need for lenses and which enables the original information to be read out as a three-dimensional image exhibiting both parallax and perspective.

Inasmuch as this invention is particularly concerned with means and methods for making and reconstructing magnetic holograms, it appears desirable to review briefly the basic principles of holography and the terminology employed in this field of wave-front reconstruction. A hologram is a record of the resultant intensity obtained in a plane at a distance from an object when the scattered radiation from the object is attended by strong, uniform, coherent background radiation. More particularly, it is an interference pattern between a reference beam of coherent radiant energy and the beam scattered by the object or information being recorded, the result being a diffraction grating modulated by the particular information contained in the object being recorded. Such a hologram bears no direct resemblance to the object, it being composed of a series of overlapping diffraction patterns, yet it contains all the information about the object and upon reconstruction by techniques described below yields this information in recognizable form.

An excellent review article on holography by Emmett N. Leith and Juris Upatnieks appeared in Scientific American, Vol. 12, June 1965, beginning on page 24. Although holography was discovered some twenty years ago by Dennis Gabor, it has received its present impetus by off-axis techniques and the development of the laser. Using this equipment, the requirement of a monochromatic coherent light source for making the hologram has been easily met.

SUMMARY OF THE INVENTION

In accordance with the present invention, a process has been devised for making and reconstructing magnetic holograms. This process employs thermorecording and reconstruction of information by means of magnetics and optics. In the main, the process comprises splitting a pulsed coherent radiant energy beam into at least two parts; one part of this beam strikes the information to be recorded and is reflected or scattered in an imagewise-modulated form into a recording member containing a hard magnetic layer under magnetic conditions in which the state of magnetization is altered by the heat provided by the incident radiation. More will be said later about the recording member. Another part of the coherent radiant energy beam is directed to the surface plane of the recording member without being modulated by the information to be recorded. A magnetic hologram of the invention is thus formed as a magnetically sensible image in the magnetic stratum in the form of an interference pattern of imagewise differing magnetic states. This interference pattern results from the summation of both amplitude and phase imagewise modulation from the several parts of the beam operating on the magnetic layer. The magnetic holograms thus obtained can be used to modulate a beam of monochromatic polarized light which is preferably coherent, incident upon the magnetic hologram by reflection, utilizing the Kerr magneto-optic effect, or by transmission, utilizing the Faraday effect, whereby real and virtual images of the original information are formed exhibiting both parallax and perspective.

Alternately, the magnetic images can be decorated by treatment with a finely particulate magnetic pigment. Images of the original object can then be reconstructed by directing a beam of monochromatic light onto the decorated surface of the decorated magnetic hologram, whereby the light is modulated and the reflected, modulated light interferes to provide real and virtual images of the original information.

THE DRAWINGS AND DETAILED DESCRIPTION OF THE INVENTION

For a fuller understanding of the process of this invention, reference should be had to the following detailed description taken in conjunction with the accompanying drawings in which.

Figures 1, 2:
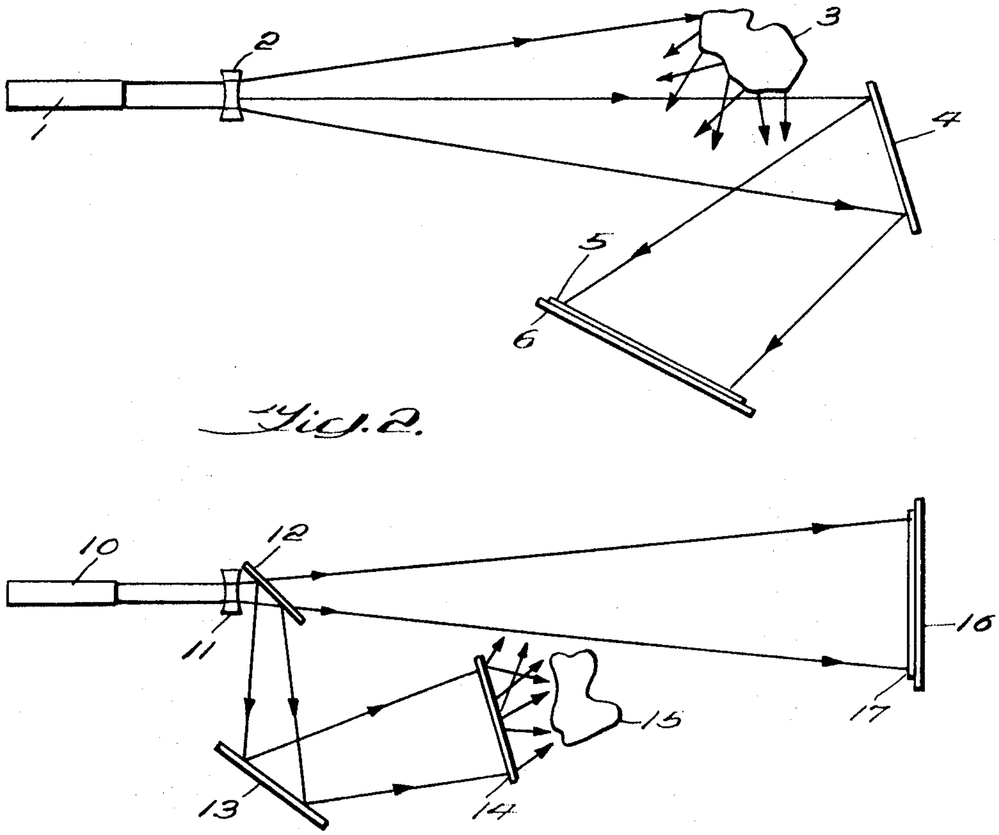
FIG. 1 is a schematic diagram which will be employed to explain the basic technique of making magnetic holograms. The arrangement shown can be used for recording a three-dimensional scene.
FIG. 2 is a schematic diagram of an arrangement for making a shadowgram wherein the object appears dark against a light background.

The basic geometrical arrangement for making and reconstructing photographic holograms is well known in the art as will be seen from the previously cited Leith et al. article and from U.S. Pat. Nos. 2,770,166; 2,982,176; and 3,083,615. FIGS. 1 and 2 diagrammatically illustrate the operation of typical geometrical arrangements.

Referring to FIG. 1, a pulsed laser 1 is used as the source of coherent energy. The laser beam passes through a diverging lens 2. Part of the beam strikes the object which is to be imaged, 3, and is reflected towards a magnetic film 5 which is supported on a substrate 6. Another portion of the beam from the diverging lens 2 is reflected by mirror 4 to magnetic film 5. The interaction of the light reflected from the object and the light from mirror 4 interact to form a diffraction pattern at the magnetic layer 5, which is heated to the vicinity of the Curie temperature in an imagewise pattern corresponding to the diffraction pattern. Under appropriate magnetic conditions, the transient heat image is converted to a magnetic image. These conditions include:

i. The magnetic recording member is uniformly premagnetized and is heated imagewise transiently to the vicinity of the Curie temperature whereby the recording member is imagewise demagnetized.

ii. A magnetic field having an intensity substantially less than the coercivity at the initial temperature of the recording member is applied to the unmagnetized recording member. On transiently heating in an imagewise fashion to the vicinity of the Curie temperature, the coercivity of the magnetic member is reduced to a value below the strength of the field in the heated regions of the recording member, whereby a magnetized image corresponding to the thermal image is produced.

iii. The magnetic recording member is uniformly magnetized and a magnetic field having a strength less than the coercivity at the initial temperature of the recording member is applied in a direction opposed to the magnetization of the recording member. The transient heat image is thus converted to an image composed of regions having a direction of magnetization opposite to the direction of initial magnetization of the recording member.

FIG. 2 shows another arrangement for forming a magnetic hologram. Light from a pulsed laser 10 passes through diverging lens 11 to a beam splitter 12. One portion of the split beam is reflected by mirror 13 through a diffusing screen 14 to the object. Light modulated by the object falls on the magnetic film 17, supported on the substrate 16. The other portion of the split beam, the reference beam, illuminates the magnetic film 17 directly, whereby interference between the light received from the object and the reference beam produces a transient heat image in the magnetic film which is converted to a magnetic image as described above.

The diffusing screen is not necessary for recording but is used in this arrangement to improve the illumination of the object or information.

In making the magnetic hologram, using either of the geometrical arrangements of FIG. 1 or FIG. 2, the reference beam is ordinarily substantially more intense than the light received at the recording member from the object. The reference beam can thus be employed as a transient heat bias to bias the magnetic material of the magnetic recording member to a temperature below the Curie temperature, but above which the changes in magnetic properties with increasing temperature become large. Filters can be used, as required, to adjust the intensity of either of the beams. Further, the diverging lens, 2 or 10, is used solely to enlarge the cross-sectional area of the beam and is not a necessary component.

Figure 3:
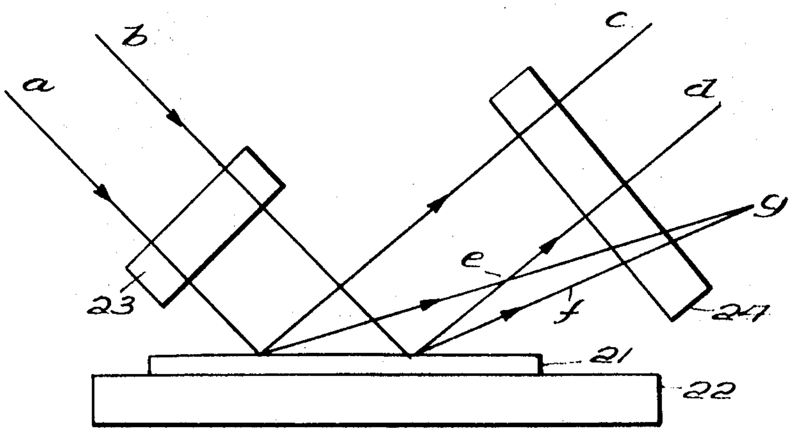
FIG. 3 is a schematic diagram showing one method of reading out a magnetic hologram utilizing the Kerr magneto-optic effect.

FIG. 3 illustrates one method of reading out a magnetic hologram formed using the techniques described with regard to FIG. 1 or FIG. 2. In FIG. 2, the magnetic hologram is formed on magnetic film 21 supported on substrate 22. A collimated beam of monochromatic light is passed through polarizer 23 onto the surface of the magnetic film, and the reflected light from the film is passed through a second polarizer 24 which acts as an analyzer. The analyzer is set so that in the absence of a magnetic image on the magnetic film, the specularly reflected polarized light is extinguished. In FIG. 3 the incident light is shown by rays *a* and *b*, and the specularly reflected unmodified light is shown by rays *c* and *d*.

If a magnetic hologram has been recorded on the magnetic film 21, there will be a pattern of areas of differing magnetization on the magnetic recording member corresponding to the hologram. Accordingly, the Kerr effect will cause the plane of polarization of the incident light to be rotated to a different degree in such areas compared with the rotation caused by the unmodified areas. This change in rotation can also be regarded as the introduction of a pattern of polarized light corresponding to the hologram having a direction of polarization at right angles to the polarization of the specularly reflected beam. This pattern will interact to reconstruct images real and virtual of the original object which are angularly displaced from the specularly reflected beam. The formation of one such image is shown by rays *e* and *f*, the image being formed at *g*.

In view of the above discussion it will be realized that the analyzer is not an essential component of the system, since the image can be spatially separated from the reflected beam. However, the specularly reflected beam is intense compared with the images of the object, and accordingly the elimination of unwanted light by the analyzer is of practical utility in observing the images.

Figure 4:
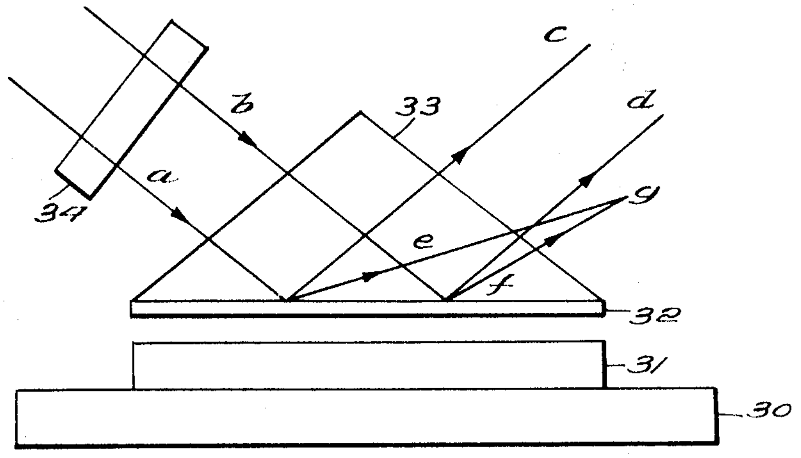
FIG. 4 is a schematic diagram of an alternate method of reading out a magnetic hologram in which the magnetic image on the magnetic hologram is transferred to a thin magnetic mirror of low coercivity formed on the face of an optical prism and read out using the Kerr magneto-optic effect.

FIG. 4 illustrates another method of reading out a magnetic hologram using the Kerr magneto-optic effect. In this method of readout, a glass prism 33 having a thin magnetic mirror film 32 is placed in contact with a magnetic hologram recorded on a magnetic film 31 supported on substrate 30 to form a magnetic recording member. The magnetic mirror film 32 is in the magnetic field generated by the pattern of magnetization of the magnetic hologram which is transferred thereto. The face of the magnetic mirror film away from the magnetic hologram is illuminated through a face of prism 33 with a beam of monochromatic light which is polarized by passage through polarizer 34, the light reflected from the magnetic mirror passing out through the other face of the prism, as shown in FIG. 4. Images of the original object are reconstructed as described in connection with FIG. 3, the rays in FIG. 4 being identified by identical letters to those employed in connection with FIG. 3.

An advantage of the system described in FIG. 4 in comparison with that of FIG. 3 is that a highly reflecting mirror surface may be employed, the Kerr conversivity of which can be enhanced by the presence of matching dielectric layers. While such magnetic mirrors are particularly suited to the utilization of the Kerr effect in readout, they are not suited to thermomagnetic read-in, since light incident thereon is reflected rather than absorbed to heat the film in the desired imagewise manner.

Figure 5:
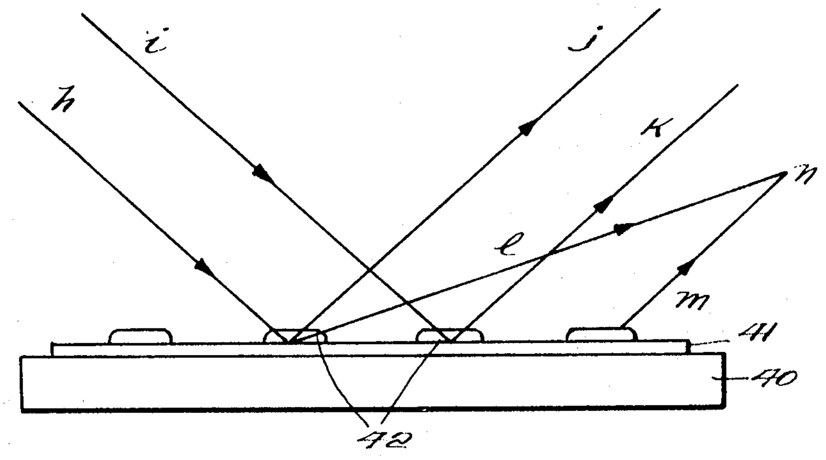
FIG. 5 is a schematic diagram of yet another method of reading out a magnetic hologram in which the magnetic holographic image is decorated with fine magnetic particles and the resultant pattern is employed to modulate a beam of monochromatic light reflected from the decorated surface of the magnetic hologram.

Another arrangement for reconstructing a magnetic hologram is shown in FIG. 5. In this method, a collimated, monochromatic beam of light is allowed to fall on a magnetic film 41 supported on substrate 40 that has been dusted with a fine magnetic powder and contains holographic information. The particle size of this powder should be small compared with the wavelength of the beam of light and small compared with the areas of magnetization. The holographic information is contained in the distribution of magnetized and demagnetized areas of the film. Only the magnetized areas such as 42 are capable of retaining the magnetic powder. The powder distribution will thus contain the same holographic information. If the powder is reflecting, no further treatment is required before reconstructing the image with reflected light. If, however, the powder is not reflecting, a thin overcoat of a reflector such as, for instance, aluminum, is employed. In FIG. 4, the incident light is indicated by rays *h* and *i* and the specularly reflected light is indicated by rays *j* and *k*. The distribution of fine magnetic powder on the surface of the magnetic film modulates the reflected light and thereby forms images of the original object or information which images are spatially displaced from the specularly reflected light. Since the formation of such images occurs when the magnetic powder decorating the magnetic film and the film itself are coated with a substantially uniformly reflecting film, it is believed that the reconstruction process by this method involves modulation of the phase of the incident light. The magnetic powder can be deposited from a colloidal suspension, such as magnetite ($Fe_3O_4$) in dilute hydrochloric acid. Viscous suspensions of colloidal magnetic particles, preferably having a maximum dimension of less than 0.1 microns, such as are employed to decorate magnetic domain boundaries to form Bitter patterns, likewise can be used to deposit the magnetic powder on the magnetic image. Further, it has been found beneficial to decorate the magnetic image in the presence of a magnetic field, generally of about 100 oe. directed perpendicularly to the plane of the magnetic layer of the recording member.

The term "coherent light" refers to light which is essentially in phase throughout the beam. This implies that the light is monochromatic, since light of differing wavelengths cannot remain in phase. In reality, light is never truly monochromatic, and a coherence length can be calculated from the formula $$L=\bar{\lambda}^2/\Delta\lambda$$

where $L$ is the coherence length, $\bar{\lambda}$ is the mean wavelength of the light and $\Delta\lambda$ is the spectral width of the light. In order to obtain diffraction effects, which are necessary to the formation of holograms, the difference in optical path length between the interfering beams must be less than the coherence length.

Accordingly, in the context of this invention, the term "-coherent" is employed in this specification and claims to mean light which is in phase and which has a coherence length greater than the difference in path length between the reference beam and the object beam.

The laser is a suitable source of coherent radiation. A sufficient amount of energy for thermomagnetic recording can be readily obtained. Further, very short pulses can be produced, generally of the order of a microsecond or less, which are well suited to forming a thermomagnetic image without substantial loss of resolution by thermal diffusion. The short pulse time available with laser sources is also useful in forming a hologram, since the object cannot be permitted to move more than a small fraction of a wavelength of the radiation during the exposure. Any of a wide variety of lasers, including a helium-neon laser producing 6,328 A. light or a ruby laser operated its normal- or Q-switched pulsed mode, can be employed, it being understood that lasers can produce beams that are coherent over $10^{10}$ wavelengths and more. It will be further understood that laser radiation outside the visible region of the spectrum or indeed any suitable source of coherent radiation which is capable of transiently heating the magnetic layer of the recording member to the desired degree can also be employed to form a magnetic hologram by thermomagnetic recording.

The hologram is recorded on a magnetic recording member comprising a stratum of a hard magnetic material on a support. The recording member can take various forms. One form is a continuous film of hard magnetic material, which is particularly useful when the easy axis of magnetization is perpendicular to the plane of the magnetic recording member, and the hologram is formed as a pattern of reverse magnetized regions over a magnetized background. Films in which the easy axis of magnetization is in the plane of the recording member can also be used to record patterns of reverse magnetization. On the other hand, such continuous films are not well suited to the formation of magnetized/demagnetized magnetic images since the pattern of domains forming a demagnetized area of the film may be relatively coarse in texture. The film can be prepared by rubbing the hard magnetic material over the substrate or by vacuum evaporation according to techniques which are well known in the art. For maximum resolution, such film will be quite thin.

Another type of recording member which is well suited to the practice of this invention has a hard magnetization compound of fine, preferably essentially single domain particles of magnetic material which are bound to each other and to the support or substrate with a binder. Such particles can be magnetically oriented in the plane of the magnetic recording by the application of an appropriately oriented magnetic field to the particles while the binder is in a flowable state. In many case, hard magnetic particles are obtained in acicular form in which the high coercivity characteristic of hard magnetic materials is obtained by shape anisotrophy, the easy axis of magnetization generally being along the length of the particles. In this case, mechanical means can be employed to orient the particles. The hard magnetic material of the magnetic recording member must be capable of magnetization such that it exhibits an energy product $(BH)_{max}$ of 0.08–8.0×$10^6$ gauss oersteds, a remanence $B_o$ of 500–21,500 gauss, a coercivity ${}_iH_c$ of 40–6,000 oersteds, and a low Curie-point temperature. Preferably, the magnetizable material should also have a high saturation magnetization. In general, by "hard" is meant that the material can be permanently magnetized, i.e., that is it has a substantial coercivity. As described above, hard magnetic material for use in the recording members of the present invention should have an intrinsic coercivity, ${}_iH_c$, of at least 40 oe.

A particularly outstanding species of the magnetic material which can be used in making the recording members of the present invention is chromium dioxide ($CrO_2$). This material can be used in substantially pure form, or modified with one or more reactive elements. The term chromium dioxide as used in this application is specifically inclusive of the pure form and the modified forms. Suitable descriptions of both the process of preparation and the compositions which have the necessary properties will be found in the following illustrative list of issued U.S. patents: Arthur U.S. Pat. No. 2,956,955; Arthur & Ingraham U.S. Pat. No. 3,117,093; Cox U.S. Pat. No. 3,074,778; U.S. Pat. No. 3,078,147; U.S. Pat. No. 3,278,263; Ingraham & Swoboda U.S. Pat. No. 2,923,683; U.S. Pat. No. 2,923,684; U.S. Pat. No. 3,034,988; U.S. Pat. No. 3,068,176 and Swoboda U.S. Pat. No. 2,923,685. For pure $CrO_2$ the Curie temperature is near 119° C. This varies somewhat, depending on the modifiers used in the synthesis of $CrO_2$, but Curie temperatures in the range of 70°–170°C. are easily attainable with modified $CrO_2$. This range of temperature is conveniently accessible and forms a preferred range for the Curie temperature of the magnetic material.

Chromium dioxide has a relatively low Curie temperature, and when in the desired particulate form has a relatively high coercivity and relatively high remanence. Finely particulate chromium dioxide further absorbs light uniformly throughout the region of the visible spectrum, i.e., it is black to the exposing light.

The range of maximum particle dimension for particulate materials such as chromium dioxide may vary from 0.1 to 10 microns, and more usually from 0.1 to 2 microns. Preferably, particles having a maximum dimension of less than 1 micron are employed in making the magnetic members.

The magnetic particles are dispersed in a hardenable binder composition which is generally organic, and coated on a suitable substrate. A magnetic field is applied, if desired, to orient the particles and the binder is hardened.

A magnetic image consists of patterns of sensible different magnetization, e.g., a pattern of magnetization on a demagnetized background or a pattern of magnetization on a background magnetized in the opposite sense. In a hologram, the modulation of the image is complex and high resolution is essential. The formation of a magnetic image by the cooperation of a heat image and magnetic conditions must be considered as a dynamic process in which the local temperature attained depends on the rate of heat input by the radiation and the thermal diffusion between each elemental area and its neighbors which may be hotter or colder than any given area. Another important factor is the local magnetic field experienced by each area due to its surroundings, which depends on the state of magnetization of the surroundings and on the extent of the locally heated spot. In general, the smaller the spot size, the greater the effect of the local field due to surrounding magnetized material. The local field tends to remagnetize a small area demagnetized by transiently heating above the Curie temperature. If the magnetized material is magnetized with the magnetic vector in the plane of the stratum of hard magnetic material, the remagnetization of a locally heated spot is in the direction of the surrounding magnetization. Thus such remagnetization offsets the effect of thermal diffusion. Since thermal diffusion can be controlled (1) by the rate of heat input (the rate of cooling being determined by the recording member) and (2) the degree of heating, the resolution attainable in the above situation is not necessarily limited by thermal diffusion or remagnetization. When the direction of magnetization is perpendicular to the plane of the recording member, as, for example, with a manganese bismuthide film, the local field about a small transiently heated spot tends to magnetize the spot in the reverse direction.

The exposure must be such as to transiently raise the elements of the magnetic stratum which are to be magnetically changed in accordance with the heat pattern produced by the hologram to a temperature in the vicinity of the Curie temperature under the conditions of magnetic field, including the local field discussed hereinabove to produce the desired magnetic hologram.

The initial temperature of the recording member can be room temperature or a temperature higher or lower than room temperature (i.e., the recording member may be heated or cooled) to provide a convenient working temperature range.

In addition to an essentially constant thermal bias by heating or cooling the entire recording member, a transient thermal bias can be supplied by the reference beam. For this purpose, the radiation of the reference beam illuminating the recording member is adjusted to provide a substantially greater intensity than the radiation received on the recording member from the information source so that the reference beam alone is sufficient to raise the temperature of the hard magnetic material to a temperature below, but in the vicinity of the lower temperature limit of the magnetic transition. Transient bias supplied by such means can be employed to minimize energy requirements for imaging the hologram. Such transient bias further has the beneficial effect of minimizing thermal diffusion, since the support is not transiently heated and consequently a high cooling rate of the magnetic elements of the stratum can be maintained.

At some arbitrary time later, the hologram can be read out so that the original object appears as a three-dimensional image. In the reconstruction step of the process of this invention, the magnetic image is employed directly or indirectly to modulate a radiant energy beam which must be monochromatic but need not be highly coherent. In the reconstruction process, the radiant energy modulated by different portions of the image interference (i.e., the magnetic hologram behaves like a diffraction grating) producing a zero-order image and a pair of first order and higher order diffracted about the zero order at different spatial angles depending on the off-axis angle of the system and to form the hologram. The zero-order energy contains no useful information and in general, the higher order diffracted images are increasingly less intense than the two first-order images, which are real and virtual images in three dimensions of the original information. If visible light is used for the reconstruction, the virtual image can be viewed visually and duplicates in parallax and perspective the original object. The geometry and working employed for reconstruction can be used to magnify or diminish the image size. If the geometry and wavelength of the radiation used for reconstruction are identical to that used for recording, the magnification of the real and the virtual images will be unity.

One of the methods for reconstructing the image from the magnetic hologram involves the Kerr magneto-optical effect, in which an incident radiant energy beam undergoes a change in its state of polarization upon reflection in the presence of a magnetic field, the degree of change depending upon the field intensity. These changes in polarization are observed visually by placing an analyzer between the hologram and the observer. The magnitude of the Kerr magneto-optic effect may be enhanced by overlaying a soft magnetic film on the hard magnetic stratum. The image can also be reconstructed by use of the Faraday effect, i.e., involving rotation of the plane of polarization of light or transmission through a magnetized medium. In the latter case, the exposed magnetic record must be significantly transparent to the reconstructing energy beam to permit enough of said beam to go therethrough to permit sensing of the images of the original. This technique is thus particularly suited to read out from thin continuous film recording media.

The utility of a magnetic hologram lies in its ability to store and subsequently allow optical reconstruction of the three-dimensional aspect of an object. A magnetic hologram, being contained on a medium which can be instantly read out, erased, and rerecorded upon, represents a significant advance over holograms recorded as density changes on ordinary photographic film. This controlled versatility makes the present invention of thermoremanent magnetoholograms and the process for the preparation thereof and imagewise reconstruction therefrom particularly attractive to and accordingly important for three-dimensional recording of television programs and reception thereof.

The embodiments of the invention in which an exclusive property or privilege is claimed are defined as follows:

1. A process for making a magnetic hologram of information which comprises splitting a pulsed coherent beam of energy into two parts, one of said parts being an object beam and striking the information, and, after being imagewise modulated by said information directing said object beam onto a magnetic recording member having a hard magnetic working layer; directing a second part of said beam without being modulated onto said recording member as a reference beam, whereby the reference beam transiently thermally biases said hard magnetic material to a temperature below but in the vicinity of the lower temperature limit of a magnetic transition temperature and combines with the object beam to further transiently heat said hard magnetic material imagewise in the form of a hologram, said magnetic recording member being maintained under magnetic conditions whereby the transient heat image is converted to a magnetic image, and reading out said magnetic image by placing an optical prism having a magnetic mirror on one face thereof with said face adjacent to said layer of hard magnetic material, said magnetic mirror comprising a thin ferromagnetic layer, whereby a magnetic image corresponding to the magnetic hologram image on said magnetic recording member is formed on said magnetic mirror; directing a beam of monochromatic polarized light onto the face of said magnetic mirror away from the magnetic recording member and observing a reconstructed image of said information at an angle to the beam of specularly reflected polarized monochromatic light.

2. Process of claim 1 wherein the said magnetic recording member is uniformly premagnetized prior to exposure and is exposed to said heat image, whereby the magnetic material of said magnetic recording member is imagewise demagnetized by said transient heat image.

3. Process of claim 1 wherein said magnetic recording member is demagnetized prior to exposure, and is exposed to said heat image in the presence of a magnetic field having an intensity less than the coercivity of the magnetic material of the recording member at the initial condition of temperature whereby the magnetic material is imagewise magnetized on exposure to said transient heat image.

4. Process of claim 1, wherein said magnetic material is uniformly magnetized prior to exposure, and is exposed to said heat image in the presence of a magnetic field having a direction opposite to the direction of magnetization of said magnetic recording member, and having an intensity less than the coercivity of the magnetic material of said magnetic recording member at the initial condition of temperature.

5. Process of claim 1, wherein said recording member comprises a layer of finely particulate hard magnetic material in a binder.

6. Process of claim 5, wherein said hard magnetic material is chromium dioxide.

7. Process of claim 1, in which said recording member comprises a thin film of a hard magnetic material.